March 31, 1931. O. U. ZERK 1,798,446
UNIVERSAL PANORAMIC TRIPOD
Filed July 25, 1927   4 Sheets-Sheet 2

Inventor:
Oscar U. Zerk

March 31, 1931.  O. U. ZERK  1,798,446
UNIVERSAL PANORAMIC TRIPOD
Filed July 25, 1927   4 Sheets-Sheet 4

Inventor:
Oscar U. Zerk

Patented Mar. 31, 1931

1,798,446

UNITED STATES PATENT OFFICE

OSCAR U. ZERK, OF CHICAGO, ILLINOIS

UNIVERSAL PANORAMIC TRIPOD

Application filed July 25, 1927. Serial No. 208,220.

My invention relates generally to apparatus for motion picture photography and more particularly to a novel form of tripod head for use in taking panoramic motion pictures.

In the taking of motion pictures it is frequently necessary or desirable to focus the camera on a horizontally or vertically moving object or to take a panoramic view of an object all of which would not appear within the field of the camera if held stationary. My invention contemplates the provision of novel improved means for mounting a camera so that such panoramic views may easily be photographed.

For convenience, the horizontal or traversing rotation of the camera will be referred to as "pan" and the vertical or elevational rotation will be referred to as "tilt". In the pan and tilt of the camera it is highly desirable that some means be used to steady the motion of the camera so as to prevent the reproduction of the view being taken, from appearing jerky and uneven. The tripod head of my invention includes a novel form of such means.

Among the objects of my invention are:

First: To provide an improved tripod for supporting a motion picture camera, in which the camera may be steadily moved by hand in taking pan and tilt views.

Second: To provide a camera support of the above mentioned type in which improved means are provided for adjusting the axis of pan movement to an exact vertical position, and the plane of rotation thereby brought horizontal.

Third: To provide a rigid means for connecting the pan and tilt mechanism to the leveling mechanism.

Fourth: To provide a single inertia and momentum steadying mechanism operative for both pan and tilt views.

Fifth: To provide a steadying mechanism which may be readily detached from the head of the tripod.

Sixth: To provide an improved fly-wheel steadying mechanism in which the friction of the speed increasing gearing is reduced to minimum, without the use of expensive ball bearings.

Seventh: To provide improved selective means for adjusting the tripod head for taking either pan or tilt views.

Eighth: To provide improved means for attaching the camera to the tripod head.

Ninth: To provide an improved ball and socket connection between the camera and its support with means whereby the camera may be readily locked in any desired angular position.

Tenth: To provide an improved guide bar or handle for manually moving the camera and an improved detachable connection between this bar and the camera supporting means.

Eleventh: To provide a tripod head which is simple in construction which may be economically manufactured and which may be easily operated.

Other objects will appear from the following description, reference being had to the accompanying drawings in which.

The tripod shown in the drawings includes generally the following structures: (1) the supporting legs with their universally connected feet, which structure and improvements thereon are disclosed and claimed in my co-pending applications, Serial No. 55,350 filed September 9, 1925, Serial No. 55,352 filed September 9, 1925, and Serial No. 208,219, filed July 25, 1927; (2) the leveling mechanism whereby the axis of rotation for pan views is adjusted to a vertical line; the universal connection between the camera supporting plate and the adjustable stationary portion of the head, disclosed and claimed in my co-pending application Serial No. 220,493, filed September 9, 1927; (3) the means for moving the camera freely and locking it in adjusted position, also claimed in said last named application; (4) the means for selectively adjusting the universal connection so as to limit its movement for taking either pan or tilt views; and (5) the means for steadying the rotative movement in taking pan and tilt views together with means for rendering the steadying means inoperative.

Figure 1:
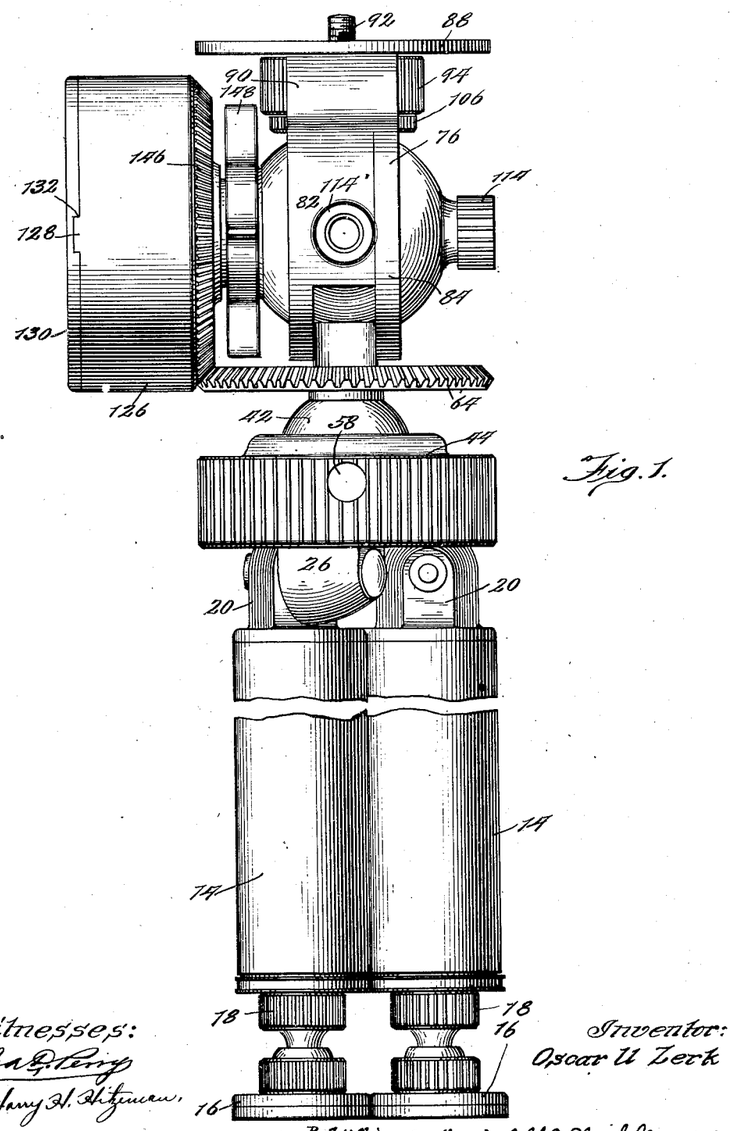
Figure 1 is a side elevation of my improved tripod, the legs thereof being shown in telescoped position.
Figures 5, 6:
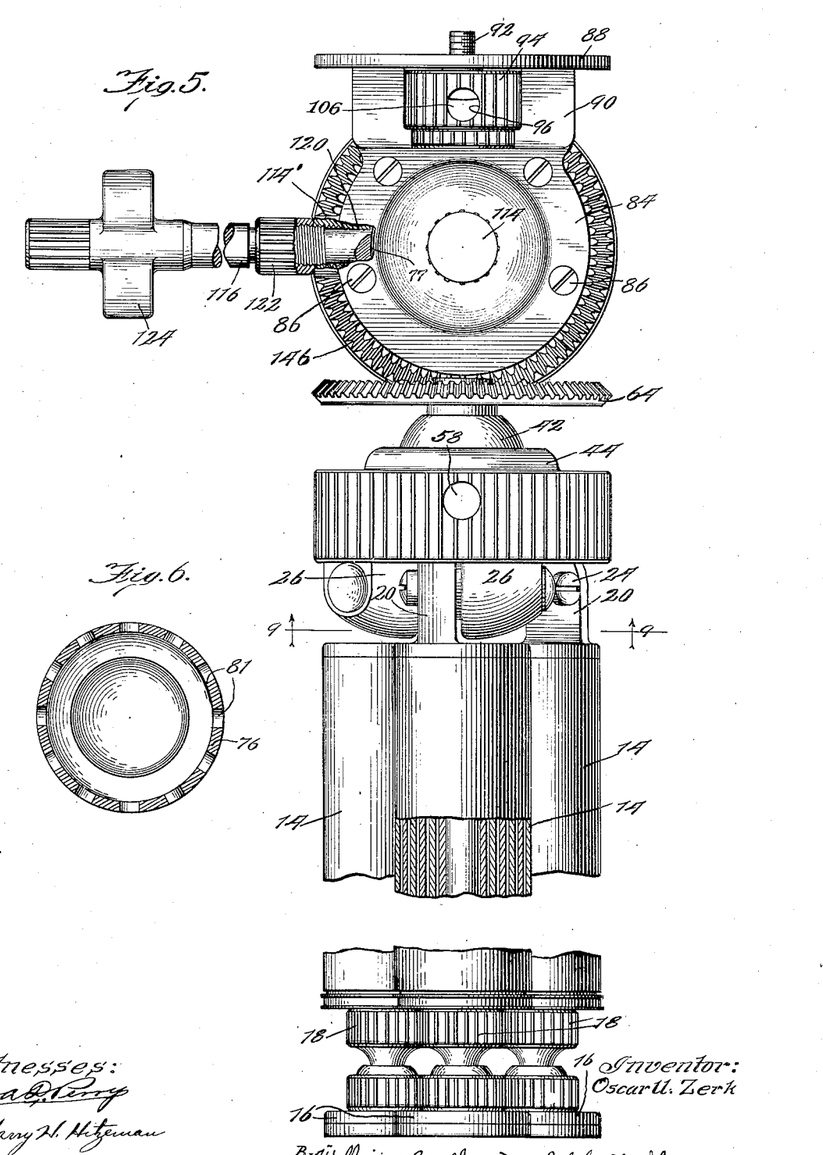
Figure 5 is an elevation of the tripod and head, parts of the apparatus being shown in broken cross-section, and the view being taken at an angle of 90° from that shown in Figure 1.
Figure 6 is a horizontal cross-sectional view of the upper ball taken on the line 6—6 of Figure 2.
Figure 9:
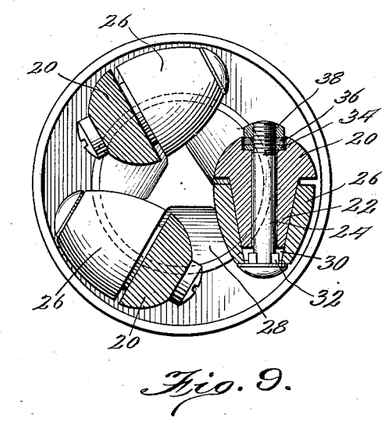
Figure 9 is a horizontal sectional view taken on the line 9—9 of Figure 5, one of the hinges being shown in section to illustrate the hinge construction.

As best shown in Figures 1 and 5, the tripod of my invention comprises generally three telescoping supporting legs 14 at the lower end of each of which is a foot portion 16 secured by means of a ball and socket joint to the header 18, which is rigidly attached to the innermost telescoping section. The upper end of each of the tripod legs 14 carries a hinge lug 20 rigidly attached to the outer section of the telescoping leg. The lug 20 (Fig. 9) has a frusto-conical side projection 22 and is drilled to receive a bolt 24. The projection 22 is of the same taper as a bore formed in a lug 26 depending from the head plate 28. The extremity of the projection 22 has a transverse slot 30 formed therein and the bolt 24 has small lugs 32 formed upon its shank directly beneath the head which fit into this slot, thus preventing relative rotation between the bolt and the hinged lug 20. A flat washer 34 and a spring lock washer 36 are pressed against a suitable recess formed in the end of the lug 20 by a kerfed nut 38. This hinged construction forms a very stable pivotal connection between the legs and the head plate, slight wear being taken up by means of the spring washer 36 and excessive wear being compensated by merely tightening the nut 38. Since the bolt 24 is constrained to rotate with the lug 20 there is no tendency for the nut 38 to become loose, thus providing a hinge in which there is practically no play, rigidity with lightness of weight of course being the desideratum in tripod construction.

Figures 2, 3, 4:
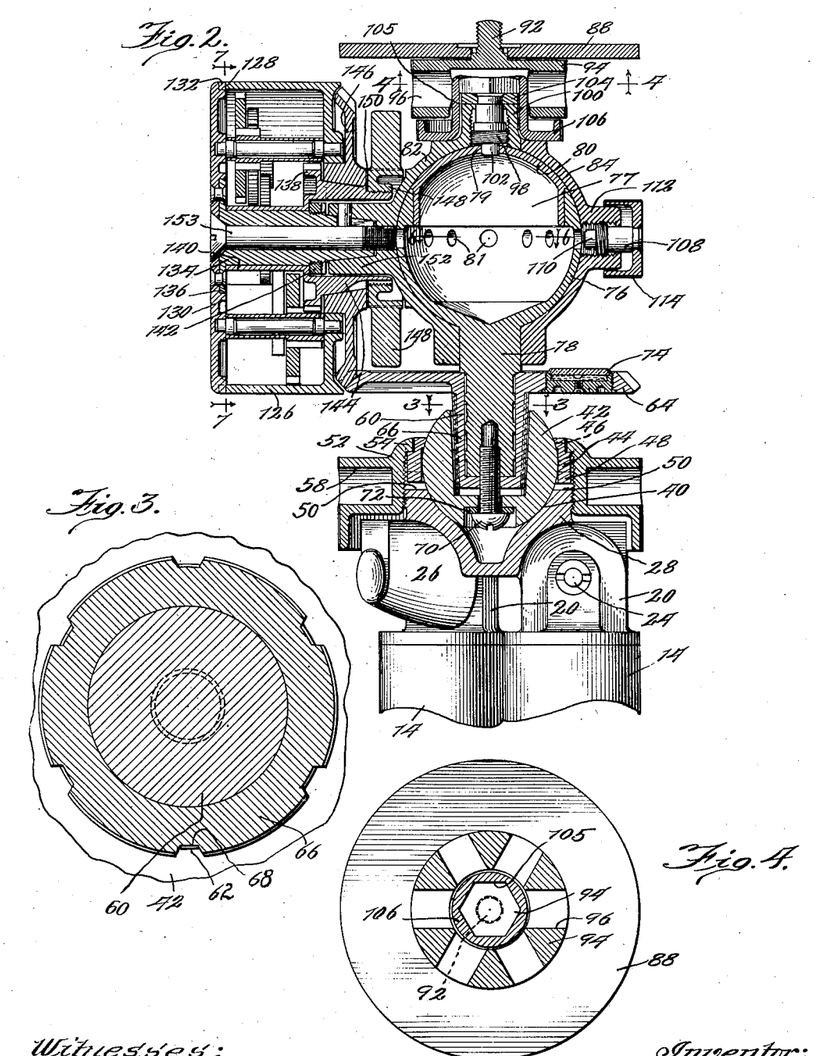
Figure 2 is a central vertical cross-section of the head portion thereof.
Figure 3 is a cross-sectional view taken on the line 3—3 of Figure 2.
Figure 4 is a cross-sectional view taken on the line 4—4 of Figure 2.

Referring to Figure 2, the head plate 28 has a practically hemi-spherical concave socket 40 which is adapted to receive a leveling ball 42. A clamping collar 44 has an annular inwardly projecting portion 46 the end of which is shaped in conformity with the spherical surface of the ball 42 and has a pair of depending lugs 48 which project into complementary notches 50 formed in the head plate to prevent relative rotation between the collar 44 and the head plate 28. A large nut 52 has an inwardly projecting annular flange 54 seating within an annular groove formed in the collar 44 and is internally threaded to engage threads formed on the head plate 28. The outer cylindrical surface of the nut is suitably serrated or ridged to provided a surface which may be readily grasped. A plurality of sockets 58 are formed in this nut so that the handle which is used in operating the tripod may be inserted to obtain additional leverage in tightening the nut. In this clamping operation the ball is prevented from turning since the collar 44, the ball 42 and plate 28 are relatively stationary. Ball 42, which may be an aluminum die casting, is formed with a tapering bore 60 extending past its center. The bore has a plurality of tapered tongues 62 (Fig. 3) which increase in width toward their bases as well as toward the lower end of the bore. A bevel gear 64 has an extended hub 66 which has a plurality of grooves 68 shaped complementary to and adapted to register with the tongues 62. The hub 66 and ball 42 are drawn firmly together by a screw 70 beneath the head of which a heavy lock washer 72 is placed. I have found that this type of joint insures a permanently tight and rigid connection between these parts.

A spirit level 74 of any suitable construction is secured eccentrically in the web of the bevel gear 64.

The lower hollowed shell portion 76 of the upper ball 77 is preferably of steel and cast integrally with a pin 78. This pin has suitable circumferential grooves cut into its lower end and is also knurled or otherwise roughened. The pin is cast within the hub 66 of the bevel gear, the grooves and its rough surface insuring rigidity of the connection. The upper cap portion 80 of the ball is also preferably made of steel and is tightly driven into the lower portion 76. The ball 77 has a vertical radial hole 79 drilled through the center of the cap 80, and a plurality of radial holes 81 (Fig. 6) drilled in a horizontal plane passing through the center of the ball, for use in taking pan and tilt views respectively, as will hereinafter be described. The ball 77 is practically surrounded by a yoke shaped socket member 82 and a retaining plate 84. The latter is secured to the former by a plurality of screws 86, (Fig. 5) the holes in the plate being sufficiently large to permit proper adjustment of the position of the plate with respect to the ball prior to drawing the screws up tight. A camera mounting plate 88 is secured to the upper yoke portion 90 of the socket member 82. A screw 92 is formed integrally with a manually engageable thumb piece 94 which has suitable cylindrical radial holes 96 into which the end of an operating handle may be inserted to obtain the leverage frequently desirable in attaching the camera.

A screw 98 is threaded in a boss 100 formed on the socket member 82, and has a downwardly projecting rounded pivot pin 102 of smaller diameter formed integrally therewith, the pin being adapted to engage in the hole 79 in the ball 77. A hexagonal plate 104 is riveted to the screw 98, and has a sliding fit within an opening 105, hexagonal in cross-section, in a manually engageable adjusting ring 106 (Fig. 4) the cylindrical surface of which is suitably roughened for manipulation by vertical ribs. Rotation of the ring 106 will cause the pivot pin to be screwed into or out of engagement with the hole 79 as may be desired. A screw 108, having a pivot pin portion 110 is threaded into a boss 112 formed upon the side of the retaining plate 84 and has a finger piece 114 riveted thereto. It should be noted that the bosses 100 and 112 are threaded from the inside and that the threads terminate short of the end of the boss so that these screws are irremovable thus eliminating the possibility of losing them.

The socket member 82 has a boss 114' formed thereon, a portion of which is internally threaded and adapted to receive the end of an operating handle 116. The end portion 118 of the handle is cylindrical in shape and adapted to fit within the bore 120 of the boss 114'. The extremity is concave so as to present a large contact surface against the ball 77. The bar is preferably made of an aluminum alloy which is softer than the ball so that the wear will take place on the rod rather than on the ball. A ribbed elongated lock nut 122 is threaded over the end of the handle so that when screwed tightly against the boss it will take up any play which may be present between the threads on the handle and in the boss, and thus making it possible rigidly to attach the handle with only a few turns thereof. The outer end of the handle has a pair of wings 124 projecting radially therefrom to provide a manual grip whereby the desired turning moment on the rod may be exerted when clamping the socket member 82 to the ball 77. It will be noted that the handle may be used to clamp the socket member 82 to the ball when, for example, it is desired to hold the camera stationary, or the handle may be screwed outwardly about a quarter of a turn until its end is no longer in contact with the ball, whereupon, by tightening the lock nut 122, the handle will be rigidly secured to the socket member, so that the matter may be freely moved in any desired direction relative to the ball. In this and other respects the combination handle and clamping means is an improvement over that shown in the patent to Thomas No. 1,272,574, dated June 14, 1917.

The operating handle may also be readily detached and used as a lever in tightening and loosening the camera screw 92 and the leveling ball clamping nut 52. The threaded portion of the handle is of greater diameter than the holes in these parts so that the threads cannot be damaged by using the handle in this manner.

As previously intimated it is very difficult to swing the camera smoothly and steadily in taking pan and tilt views. The mechanism used to accomplish this purpose will now be described.

Figure 7:
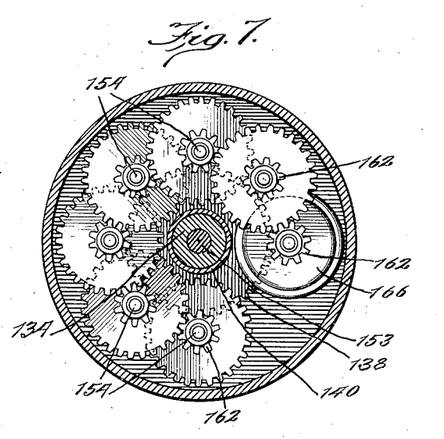
Figure 7 is a vertical cross-sectional view taken on the line 7—7 of Figure 2 and showing the pan and tilt steadying mechanism.
Figure 8:
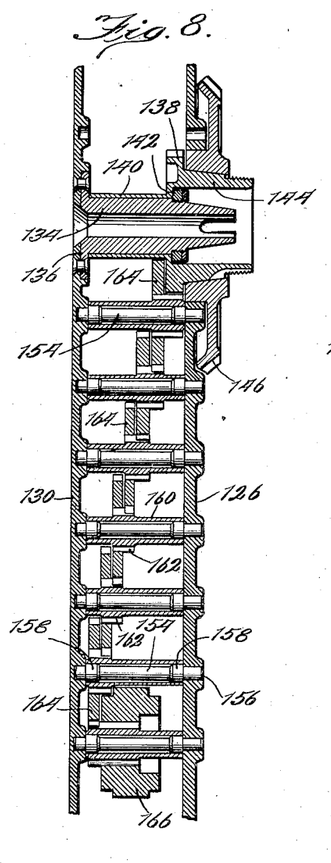
Figure 8 is a developed sectional view of the mechanism shown in Figure 7, taken along the line of centers of the shafts.

The mechanism is contained in a housing 126 (Figs. 2, 7 and 8) which has a plurality of notches 128. A cover plate 130 has suitable lugs or projections 132 which fit into the notches and thus prevent relative rotation between the cover plate and housing. A hollow shaft 134 has a flange 136 which is riveted to the cover plate 130. A sun gear 138 has an elongated sleeve-shaped hub 140 bearing on the shaft 134 and is prevented from sliding axially by a nut 142 threaded over the shaft. The gear 138 also has a tapered hub-shaped portion 144, the end portion of which is threaded. A bevel gear 146, meshing with the bevel gear 64, has its central bore tapered to fit over the hub portion 144 and is adapted to be clamped thereto by a wing nut 148. A spring washer 150, interposed between the wing nut 148 and hub of the bevel gear normally holds the bevel gear in light frictional engagement with the tapered portion 144. The shaft 134 is tapered at its end and fits within the tapered bore in a boss 152, suitable interlocking surfaces being provided to preclude the possibility of relative rotation of these parts. A screw 153 extending through hollow shaft 134 is threaded into the boss 152 and thereby secures the housing, cover plate and associated parts to the socket member 82. A plurality of spindles 154 are carried by the housing 126, each having a reduced end portion 156 which may be striated or otherwise roughened and driven into suitable holes in the casing. The opposite ends of the spindles fit in sockets formed in the cover plate 130. Each of the spindles has enlarged bearing portions 158. Sleeves 160 which have small pinions 162 formed integrally therewith are freely rotatable on the spindles, bearing only at the portions 158 thereby reducing the friction of rotation. Gears 164 have central openings shaped to the cross-sectional outline of the pinions 162 and are driven over the pinions. This sleeve, pinion and gear assembly can be economically manufactured and forms a very satisfactory simple construction for the purposes desired. The gears and pinions intermesh to form a speed increasing train, the low speed pinion of the train meshing with the sun gear 138 and the highest speed pinion carrying a fly-wheel 166 which may be secured thereto in the same way as the gears 164 are fixed to their pinions 162.

The method of operation of my tripod is as follows:

The head plate 28 is approximately leveled by adjusting the positions of the legs 14. The stem of the ball 42 and all the mechanism attached to it are then brought to an exact vertical position by leveling the bevel gear 64 while observing the indication of the spirit level 74. This is done by loosening the clamping nut 52, using the operating handle 116 if necessary and then tightening after the bubble in the spirit level has been brought to its central position. We will now assume that it is desired to photograph a number of scenes in different directions but with the camera held stationary for each scene. The screw 108 will be turned to withdraw the pin 110 from one of the holes 81 and the ring 106 rotated to withdraw the pin 102 from the hole 79. The wing nut 148 will then be loosened to disconnect the fly-wheel steadying mechanism. The handle 116 will then be screwed into the boss 114', and after the camera has been attached by rotation of the screw 92, the camera may readily by shifted in any desired direction by manipulation of the operating handle 116. When the camera has been properly positioned, a half turn or less of the operating handle 116 will bring its concave end into frictional contact with the surface of the ball 77 and thus firmly lock the socket member 82 to the ball and form a rigid support for the camera. When it is desired to shift the camera so as to focus it in a different direction, it is necessary merely to unscrew the operating handle 116 about a half turn and point the camera in the desired direction and again lock it in position by screwing up the handle 116.

If desired the finger piece 114, together with its inwardly projecting pin 110, may be utilized to exert friction between the socket 82, 84 and the ball 80 whenever the pin 110 is not in registry with one of the holes 81 in the ball. This is a desirable feature since it makes possible the clamping of the ball and socket when, for example, the guide-bar is being used with the camera attaching screw 92, 94 to secure the camera to the tripod head, when the guide-bar is lost, or when, for any other reason, the guide-bar is not attached to the socket. Due to the greater area of contact between the ball and the socket and also due to the fact that the area of contact is a greater distance from the horizontal axis of rotation, the parts may be rigidly clamped together without the exertion of a very great pressure by the pin 110. If desired, the pin 102 may also be utilized to clamp the ball and socket together whenever this pin is not in registry with the hole 79. These alternative means for clamping the ball and socket or for creating friction between the ball and socket by a clamping pressure exerted at right angles to that applied by the guide-bar will add to the convenience in the operation of the tripod head. These alternative means for creating friction may very conveniently be used when the tripod is being carried in its case, in which instance the guide-bar is of course disconnected from the socket.

If it is desired to take a pan view, the camera plate 88 is brought to the horizontal position so as to bring the pin 102 in registry with the hole 79. The pin may then be projected into the hole by turning the ring 106. This pin thus forms a vertical pivotal axis for the socket member 82 thus precluding any but rotational movement of the camera in a horizontal plane. If it is desired to take a tilt view, the pivot pin 102 is withdrawn and the pin 110 inserted in one of the holes 81. If one of the holes 81 does not happen to lie in registry with the pin 110 when the camera is pointed in the desired direction, the camera is shifted slightly until the pin may be inserted in one of the holes 81 adjacent the desired point. The clamping nut 52 is then loosened and the camera pointed exactly in the desired direction, relative movement between the camera and the tripod taking place between the leveling ball 42 and its socket. When the camera has been pointed in the desired direction the bevel gear 64 and parts carried thereby are leveled as previously described and the ball 42 again securely clamped in its socket. When the parts are thus positioned, it is possible to rotate the socket member 82 and all associated parts, including the camera, about the horizontal axis of the ball 77 which is coincident with the axis of the pin 110. As above described, the fly-wheel steady mechanism was considered to be disconnected, that is, the wing nut 148 was screwed to its furthermost position towards the right (Figure 2).

The operation of the tripod head when the fly-wheel steadying mechanism is employed will now be described. Whenever it is desired to take a vertical or a horizontal panoramic view, the wing nut 148 is screw up toward the left (Figure 2) thereby clamping the bevel gear 146 to the hub portion of the sun gear 138. Assuming that the pivot pin 102 is projected within the hole 79 and the pin 110 withdrawn, the device is in condition for the taking of horizontal panoramic views. Rotation of the socket member 82 about the vertical axis of the ball 77 will cause rotation of the bevel gear 146. The housing 126 and cover plate 130 will, of course, be held from rotation about the axis of the screw 153. There will thus be relative motion between the sun gear 138 and the spindles 154, causing rotation of the pinion 162 which is in engagement with the gear 138. This rotative movement will be transmitted through the speed increasing gear train to the fly-wheel 166. Due to the friction and inertia of the gear train and inertia of the fly-wheel, it will be impossible to impart an irregular, unsteady rotative movement to the camera, the gear train and fly-wheel acting as a brake during accelerating movement and as a motor during deceleration, thus tending to compensate for irregularities in the force applied to the handle by the operator.

When taking a tilt view with the steadying mechanism engaged, there will be no relative movement between the bevel gears 64 and 146 but instead the central shaft 134 together with the cover plate 130 and housing 126 will be rotated. The sun gear will of course be stationary, but as the housing, and the spindles 154 are revolved about the sun gear, the pinion 162, which is in mesh with the sun gear, will be rotated and transmit the rotative movement to the gear train and fly-wheel. It will be noted, however, that in this case the rotation of the casing with the first pinion 162, (which is planetary with respect to the sun gear 138) will cause the fly-wheel to be rotated faster than when the train is rotated by the sun gear as when taking pan views. Consequently, it might be assumed that the force required to tilt the camera would be greater than that required for the pan. This, however, is not true due to the fact that during the tilt one less gear is in the gear train to the fly-wheel since at this time the bevel gear 146 is held stationary. It has been found to be a fact that when the bevel gears 64 and 146 each have the same number of teeth, the force required for the tilt is slightly less than for the pan. This may of course be remedied by slightly altering the ratio between the diameters of these two bevel gears.

By the construction as above described, I have provided a simple and effective means whereby a single fly-wheel steadying mechanism may be utilized for both pan and tilt views. When in the taking of a pan or tilt view it is desired suddenly to move the camera a short distance, as for example when following an animal which is normally walking but suddenly jumps, the camera may be maintained focused upon the object by giving the operating handle a sudden jerk. This sudden force will break the frictional connection between the bevel gear 146 and the tapered hub of the sun gear 138, thereby permitting free movement of the socket member 82 and attached camera without rotating the fly-wheel steadying mechanism. As soon as the sudden force is abated, the bevel gear will again be forced into frictional contact with the tapered hub of the sun gear 138 by the spring washer 150.

While I have shown but a specific embodiment of my invention, variations thereof may be made without departing from the principles thereof. For example, the ball 77 may be made with two great circle grooves, one in a horizontal plane and the other in a vertical plane, into which the pins 110 and 102 are adapted to project, the pin which is projected sliding in its respective groove thereby to limit the movement of the camera to a horizontal or vertical plane. I consider it within the scope of my invention to substitute a different type of universal connection for the ball 77 and the socket member 82, although the structure shown and described has many peculiar advantages when used in the combination shown. Other means for insuring movement of the camera in a true horizontal or vertical plane may be employed. Furthermore, to decrease the play or backlash in the gearing double gears may be used in which the gears of a pair are pressed in opposite directions by a spring, such for example as shown in the patent to Dubois No. 1,240,126 granted September 11, 1917.

Other variations in structure and design may be made by adding various parts, omitting some of the features or substituting elements without departing from the principles of my invention. I therefore desire the scope of my invention to be limited only by the claims which follow.

I claim:

1. In a device of the class described, the combination of a relatively stationary support, a camera carrying member mounted upon said support, means for selectively conditioning said member for rotation about a vertical axis only or about a horizontal axis only, and a single steadying means operative while said camera is being rotated about either of said axes.

2. In a device of the class described, the combination of a universally adjustable stem, a ball secured to said stem and having a plurality of horizontally disposed spaced radial holes formed therein, a socket member fitting over said ball, camera attaching means carried by said member, a handle secured to said socket member, and means for limiting movement of said socket member to rotation about a horizontal axis comprising a pin carried by said socket member and adapted to be projected within one of said holes formed in said ball.

3. In a device of the class described, the combination of a ball, a socket member fitting over said ball, camera attaching means carried by said member, a vertical radial hole at the top of said ball, and a plurality of horizontal radial holes spaced about said ball, a pin adapted to be projected within said vertical hole thereby to limit said socket member to rotative movement about a vertical axis, and a second pin carried by said socket member and adapted to be projected into one of said horizontal holes thereby to limit said socket member to rotative movement about a horizontal axis, and means whereby said pins may be selectively moved into or out of the holes in said ball.

4. In a device of the class described, a ball, a yoke-shaped socket fitting over said ball, means for securing a camera to said yoke-shaped socket, means for pivotally connecting said socket and said ball to permit rotation of said socket about a vertical axis only, means for pivotally connecting said socket and said ball to permit rotation of said socket in a horizontal axis only, and single means other than the frictional engagement of said ball and socket for retarding acceleration of said socket member when rotated about either one of said axes.

5. In a device of the class described, a tripod head plate having a socket formed therein, a ball resting within said socket, means for clamping said ball in said socket, a second ball rigidly secured to said first named ball, a socket member fitting over said second ball, means for securing a camera to said socket member, means for pivotally connecting said socket member and said second ball to permit rotation about a vertical axis only, means for pivotally connecting said socket member and said second ball to permit rotation of said socket member about a horizontal axis only, and means for applying a braking force for retarding acceleration of said socket member when rotated about either of said axes.

6. In a device of the class described, the combination of a vertically disposed stem, a horizontal bevel gear secured thereto, a ball secured to said stem above said gear, a socket member mounted on said ball and adapted to carry a camera, a geared fly-wheel mounted in a casing attached to said socket member, and a vertical bevel gear adapted to be operatively connected to said fly-wheel, said vertical bevel gear being in mesh with said horizontal gear whereby said fly-wheel will be rotated when said socket member is moved relative to said horizontal bevel gear about either a vertical or a horizontal axis.

7. In a device of the class described, the combination of a camera supporting member, selective means operable to condition said member for manual rotation about a vertical axis only or a horizontal axis only, and a single fly-wheel mechanism operative upon rotation of said member about either of said axes thereby to steady the rotative movement.

8. In a device of the class described, the combination of a ball, a socket member clamped about said ball but freely movable relative thereto, camera attaching means secured to said member, and means on said socket member engageable with said ball for selectively guiding said member for rotative movement about a horizontal or a vertical axis, said last-named means including a pair of pins adapted to be projected into guiding means in said ball.

9. In a device of the class described, the combination of a universally adjustable stem, a camera supporting member universally connected to said stem, means for selectively conditioning said member for rotation about a vertical or a horizontal axis, and a single fly-wheel mechanism operative upon rotation of said member about either of said axes thereby to steady the rotative movement.

10. In a device of the class described, the combination of a universally adjustable stem, a plate member 64 rigidly secured thereto and adapted to lie in a horizontal plane, a level indicator carried by said plate member, a hollow ball secured to said stem above said plate member and having a plurality of spaced radial holes formed in a horizontal plane, a socket member fitting over said ball, and adapted to carry a camera, a handle secured to said socket member, and means for limiting rotative movement of said socket member to a horizontal axis comprising a pin carried by said socket member and adapted to be projected within one of said holes formed in said hollow ball.

11. In a device of the class described, the combination of a ball, a socket member fitting over said ball and adapted to carry a camera, a vertical radial hole at the top of said ball, a pin adapted to be projected within said vertical hole thereby to limit said socket member to rotative movement about a vertical axis, and means whereby said pin may be selectively moved into or out of the hole in said ball.

12. In a device of the class described, the combination of a vertically disposed stem, a horizontal bevel gear secured thereto, a member pivotally mounted on said stem and adapted to carry a camera, a geared fly-wheel mounted in a casing attached to said member, a vertical bevel gear adapted to be operatively connected to said fly-wheel, said vertical bevel gear being in mesh with said horizontal gear whereby said fly-wheel will be rotated when said member is pivoted relative to said stem.

13. In a device of the class described, the combination of a relatively stationary horizontally disposed bevel gear, a camera mounting member universally connected therewith, a shaft secured to said member, a vertically disposed bevel gear meshing with said horizontal bevel gear and rotating about said shaft, a casing secured to said shaft, a fly-wheel rotatively mounted within said casing, speed increasing gearing mounted within said casing and adapted to rotate said fly-wheel, a sun gear adapted to actuate said gearing and rotatively mounted on said shaft, and means comprising a friction clutch mechanism for selectively connecting said vertical bevel gear to said sun gear.

14. In a device of the class described, the combination of a relatively stationary ball having a radial vertical recess at its top, a socket member carried by said ball, a camera supporting plate secured to said member, a camera supporting screw having a manually operable enlarged head lying below said plate and partially within said socket member, a pin threaded in said socket member and adapted to be projected within said recess, a plate secured to the upper end of said pin, and a manually engageable ring having an axial bore shaped to receive said plate, said ring being rotatably mounted in the enlarged head of said screw and adapted to rotate said pin through engagement with said plate.

15. In a tripod, the combination of a relatively stationary ball having a depending stem, a socket member having a relatively long arcuate slot to permit rotation of said socket member about a horizontal axis relative to said ball, a combination guide-bar and clamping element detachably secured to said socket member, and means independent of said guide-bar adapted to clamp together said ball and socket member by pressure exerted in a direction at an angle to the plane of said arcuate slot, said means exerting a frictional clamping force directly between said ball and its socket member.

16. In a tripod, the combination of a head having a socket formed therein, a ball adapted to be clamped in said socket, a second ball rigidly connected to said first named ball, and camera supporting means universally mounted on said second ball.

In witness whereof, I hereunto subscribe my name this 20 day of July, 1927.

OSCAR U. ZERK.